United States Patent
Demick et al.

[11] Patent Number: 6,135,549
[45] Date of Patent: Oct. 24, 2000

[54] VEHICLE SEAT WITH COMPUTER STORAGE AND WORK TABLE

[75] Inventors: Robert L. Demick, Eastpointe; Hoon Kim, Detroit, both of Mich.

[73] Assignee: Johnson Controls Technology Company, Plymouth, Mich.

[21] Appl. No.: 09/134,716

[22] Filed: Aug. 14, 1998

(Under 37 CFR 1.47)

[51] Int. Cl.⁷ ........................................................ A47C 7/62
[52] U.S. Cl. .......................... 297/188.1; 297/144; 108/44
[58] Field of Search ..................... 297/188.08, 188.09, 297/188.1, 144, 237; 108/42, 44; 312/235.2

[56] References Cited

U.S. PATENT DOCUMENTS

| | | |
|---|---|---|
| 1,834,817 | 12/1931 | Woodfin . |
| 2,804,122 | 8/1957 | Baum ..................... 297/188.1 |
| 4,341,418 | 7/1982 | Chappell . |
| 4,555,135 | 11/1985 | Freeland ................... 297/237 |
| 4,946,120 | 8/1990 | Hatcher . |
| 4,986,589 | 1/1991 | McNew . |
| 5,597,199 | 1/1997 | Hoffman et al. ....................... 297/188.1 |
| 5,628,439 | 5/1997 | O'Hara . |
| 5,720,514 | 2/1998 | Carlsen et al. ......................... 297/188.1 |
| 5,848,820 | 12/1998 | Hecht et al. ...................... 297/188.1 X |
| 5,913,571 | 6/1999 | Dystra et al. .................... 297/188.1 X |

*Primary Examiner*—Anthony D. Barfield
*Attorney, Agent, or Firm*—Harness, Dickey & Pierce, P.L.C.

[57] ABSTRACT

A table is contained within the seat bottom of the vehicle seat assembly which includes storage for a portable personal computer on a movable platform. The platform is movable from a stowed position within the horizontal seat bottom to a raised generally horizontal use position for use of the personal computer by an occupant of an adjacent seat assembly within the motor vehicle. When the computer is not in use, the top surface of the computer can be used as a writing surface or alternatively, the platform carrying the personal computer can have a movable lid which can be used as a writing surface. In addition to storing the computer, the seat assembly has spaced shelves for storage of files and other papers.

20 Claims, 3 Drawing Sheets

VEHICLE SEAT WITH COMPUTER STORAGE AND WORK TABLE

BACKGROUND AND SUMMARY OF THE INVENTION

The present invention relates to a vehicle seat assembly with storage for a personal computer and a work table within the seat bottom. The work table contains means for storing a personal computer in the seat bottom and is movable from a stowed position to a raised, generally horizontal use position for use by a person seated in an adjacent vehicle seat.

Vehicle owners are expecting more and more features in their vehicles which make a motor vehicle more useful and more than simply a means of transportation. Many people who travel by vehicle for business purposes may conduct a significant amount of business from within their vehicles. A flexible vehicle seat, such as a front passenger seat with a desktop, is desired by persons working out of their vehicles. The present invention provides a vehicle seat assembly that contains a table that can be used as a writing surface or for supporting a computer for use by a person seated in the driver's seat. The table is stowed beneath the seat cushion and can be used to store a personal computer beneath the seat cushion.

The table is accessed by raising the center portion of the seat bottom pad to reveal the space beneath the pad. The table is then pulled upward to a position above the seating surface and rotated to a generally horizontal position. Once in a horizontal position, the table is rotated about a vertical axis toward the occupant of an adjacent seat. The table forms a carriage to which a computer can be attached. The top surface of the computer can be used as a writing surface to support a pad of paper. Alternatively, with the computer removed, the table can be used as a writing surface. The seat assembly may include a power point electrical connection to connect the computer into the vehicle battery to conserve the charge of the computer's battery.

In one embodiment of the invention, the table is moved from a stowed position at an incline rearward and upward and then later rotated to the horizontal position. In addition to providing computer storage, file and other paper storage slots are also provided in the seat bottom beneath the cushion pad.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
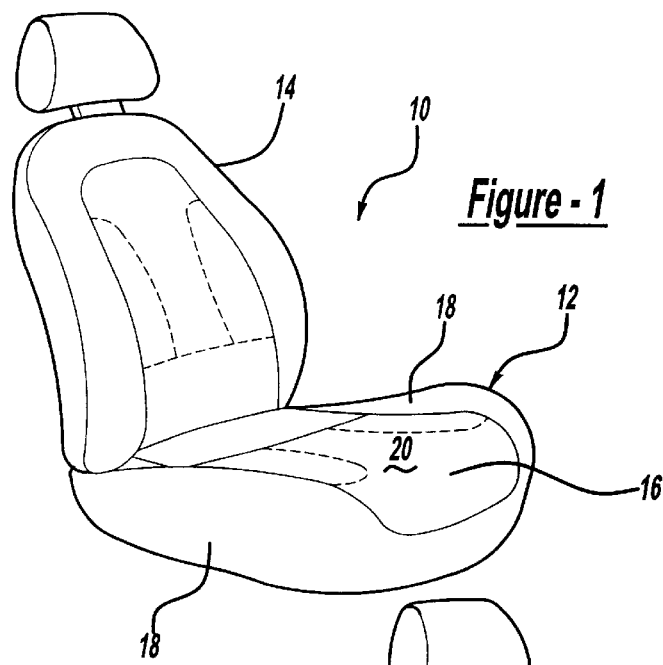
FIG. 1 is a perspective view of a vehicle seat assembly containing the table of the present invention.

A vehicle seat assembly as shown in FIG. 1 and generally at 10 and contains the table of the present invention. The seat assembly 10 contains a generally horizontal seat bottom upon which a seat occupant is seated. A seat back 14 extends back generally upwardly at the rear end of the seat bottom 12.

Figure 2:
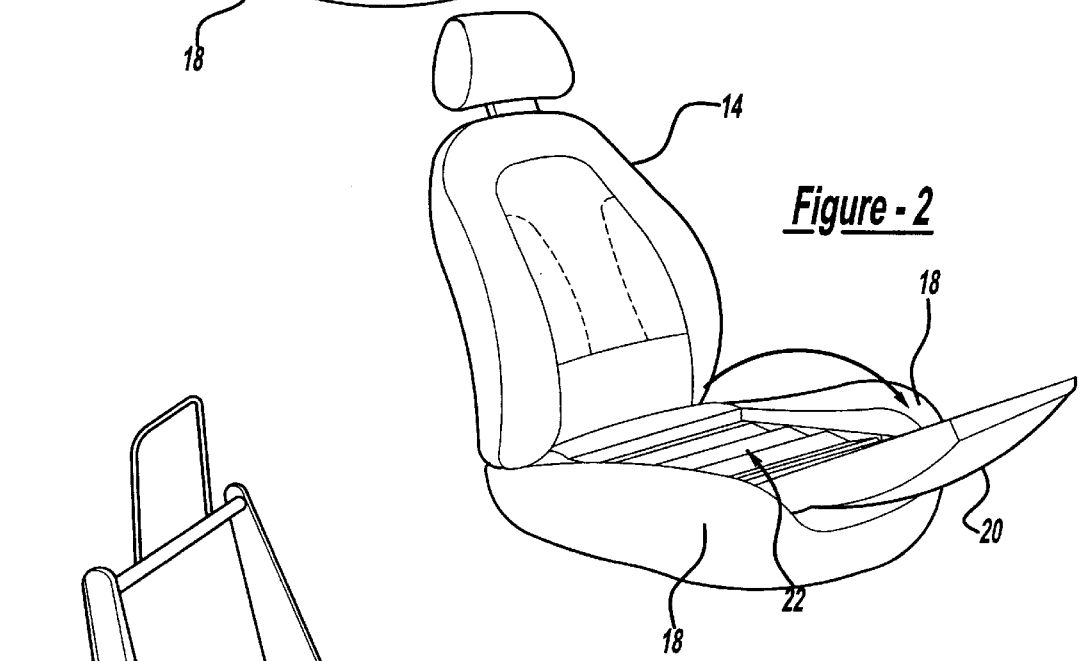
FIG. 2 is a perspective view, similar to FIG. 1, showing the center insert of the seat bottom pad raised to reveal the table therebeneath.

The seat bottom 12 has a resilient pad covered by a trim cover. The pad includes a pair of side bolsters 18 on each side of the insert section 16. The insert 20 can be moved relative to the bolsters and the frame structure of the seat bottom by lifting the rear portion upward to an open position as shown in FIG. 2. The insert can be attached to the remainder of the seat bottom by a fabric hinge formed on the trim cover. By raising the insert 20, the seat bottom 16 is open, providing access to the area 22 beneath the resilient pad of the seat bottom. The table of the seat assembly 10 is stored in this area 22 beneath the insert 20.

Figure 3:
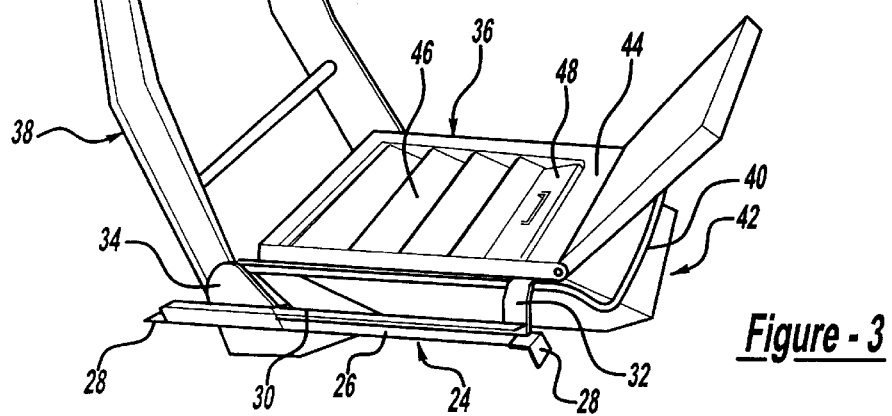
FIGS. 3–7 are perspective views of the frame structure of the seat assembly showing the table in various positions between fully stowed in FIG. 3 and fully deployed in FIG. 7.

With reference to FIG. 3, the structural frame of the seat assembly 10 is shown in greater detail. The seat assembly 10 includes a pair of slide tracks 24 along each side of the seat assembly, only the outboard slide track 24 is shown in FIG. 3. Each slide track includes a fixed lower rail 26 having a pair of mounting bosses 28 for attaching the slide track to a motor vehicle. In addition, each slide track includes an upper rail 30 which moves fore and aft relative to the lower rail 26 in known manner for adjustable vehicle seat assemblies.

Front and rear risers 32 and 34, respectively, extend upwardly from each upper rail 30. The seat bottom frame 36 is attached to the front and rear risers. In addition, a seat back frame 38 is pivotally attached to the rear risers 34. As shown in FIG. 3, a cross bar 40 extends transversely across the front of the seat bottom. The cross bar 40 is a release handle for the fore and aft adjuster of the seat assembly. Lifting the bar 40 releases the slide tracks enabling the upper rail to move relative to the lower rail to adjust the position of the seat assembly within a motor vehicle in a conventional manner.

The table is contained within a module 42 mounted below the seat bottom frame 36 between the two slide tracks 24. The front portion of the seat bottom frame includes a support 44 for the resilient pad. The rear two-thirds or three-quarters of the seat cushion frame is generally rectangular, and is open in the center for accessing the module 42 located below the seat bottom frame. The module 42 includes a number of shelves 46 which are inclined downwardly and forwardly as shown in FIG. 3. These shelves are spaced apart from another and form storage compartments for miscellaneous papers, notepads, files, etc., to be stored in the seat bottom.

Figure 4:
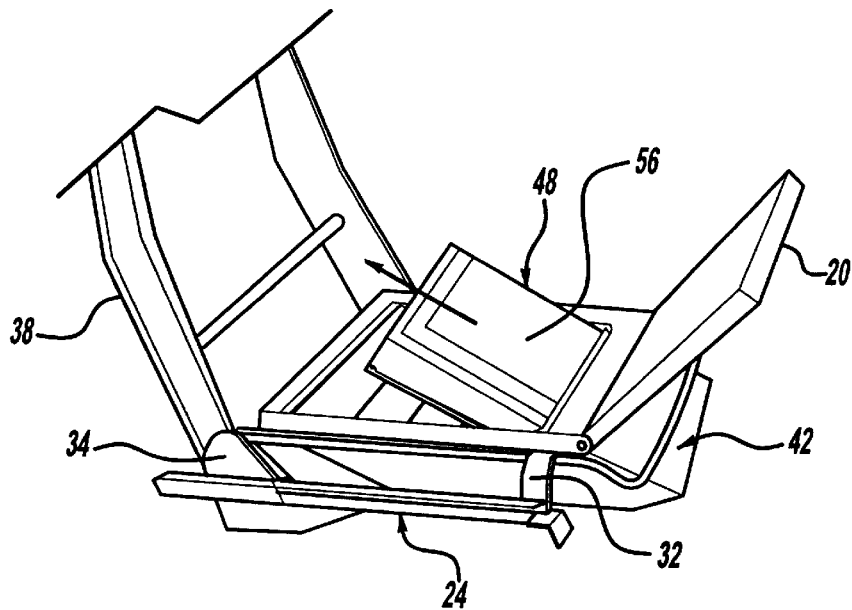
Figure 5:
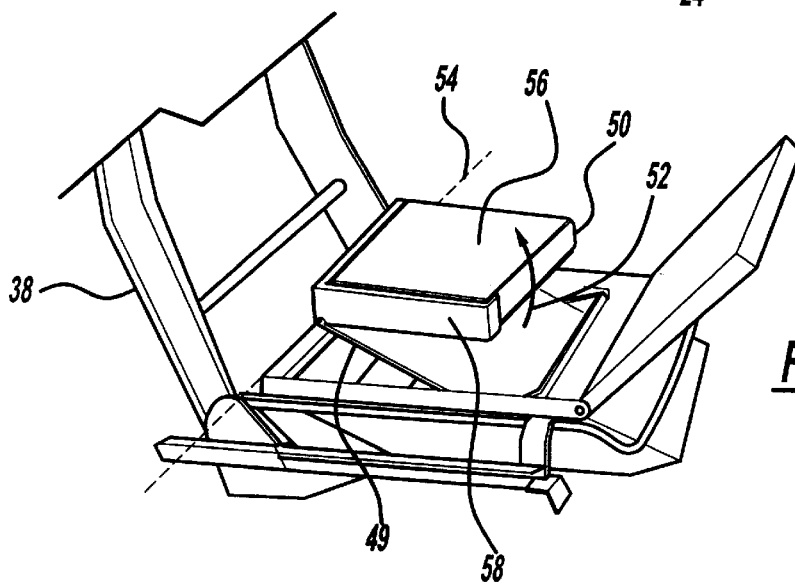

Foreword of the shelves 46 is a movable platform 48 which, like the shelves 46, is inclined forwardly and downwardly beneath the seat bottom frame. The platform 48 includes a guide 49 (FIG. 5) which is mounted within the module on slides, enabling the platform 48 to be moved up and rearward as shown in FIG. 4 as if pulling a drawer open. Once the platform 48 is pulled out as shown in FIG. 4, the platform locks in the raised position. A top portion 50 of the platform is then raised off the guide by lifting the front of the top portion 50 as shown by the arrow 52, rotating the top portion about an axis 54. This raises the top portion 50 of the platform to a generally horizontal position as shown in FIG. 5. In this position, the platform can be used as a writing surface for the seat occupant of an adjacent seat assembly.

The top portion 50 of the platform 48 includes a base 58 and a cradle 60. The cradle 60 is pivotally attached to the base 58 at the right forward corner by a mounting boss 62. This enables the cradle 60 to pivot about a vertical axis 64 at the right front corner. This allows a rear edge 66 of the cradle to face the adjacent seat. The pivot axis 64 could be at other locations enabling the cradle to move laterally further toward the adjacent seat if desired. For example, the pivot axis 64 could be located at the left front corner enabling the cradle to pivot further laterally toward an adjacent driver's seat located left of the seat assembly 10.

Figure 6:
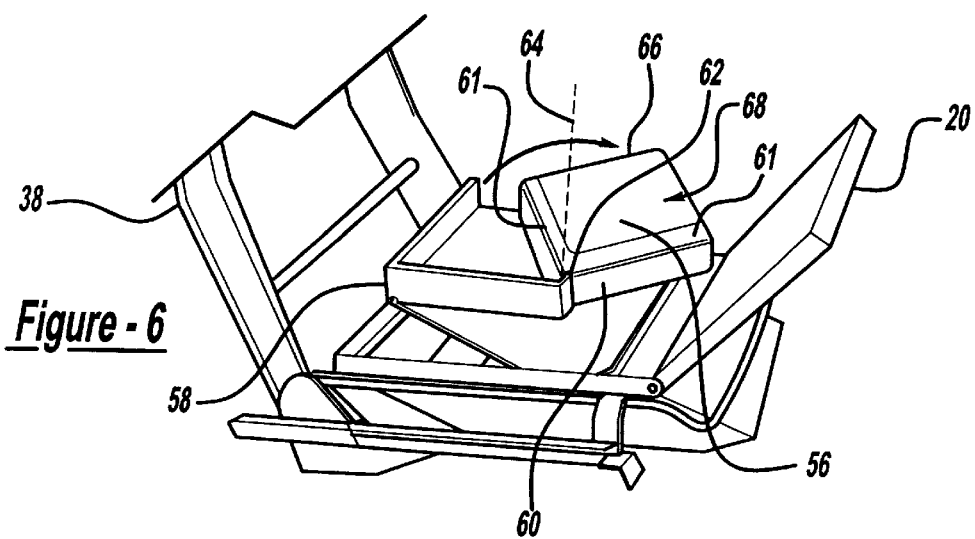
Figure 7:
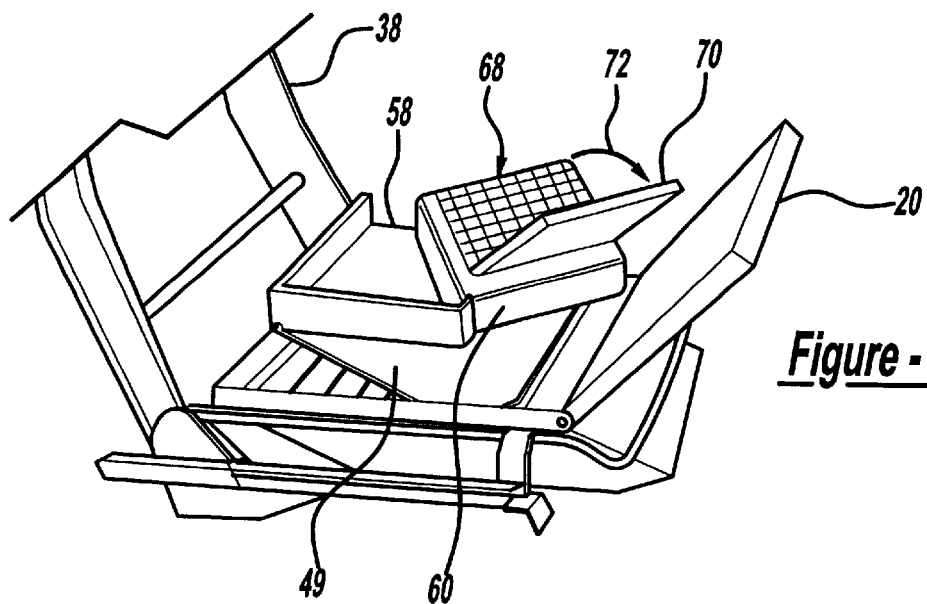

The cradle 60 is constructed to mount a laptop or notebook personal computer 68 to the cradle. This can be accomplished by hook and loop fastener strips such as Velcro® attached to the bottom of the computer and the cradle or by other mechanical fasteners designed to engage with the computer case and attach it to the cradle. With the cradle rotated toward the adjacent seat, as shown in FIGS. 6 and 7, the lid 70 of the personal computer can be rotated upward as shown by the arrow 72, opening the computer with the keyboard facing toward the occupant of the adjacent seat assembly.

The seat assembly of the present invention provides for storage of a laptop personal computer within the seat bottom as well as a table or platform for use of the laptop computer by an adjacent seat passenger. In the embodiment shown in the FIGS. 3–7, the top of the personal computer forms the horizontal desktop surface 56 that can be used as a writing surface when the computer is not in use. Alternatively, with the computer removed, the cradle forms a table to write upon. In the illustrated embodiment, the cradle has an upstand wall 61 along two sides. This wall 61 can be eliminated to provide a large flat writing surface.

Figure 8:
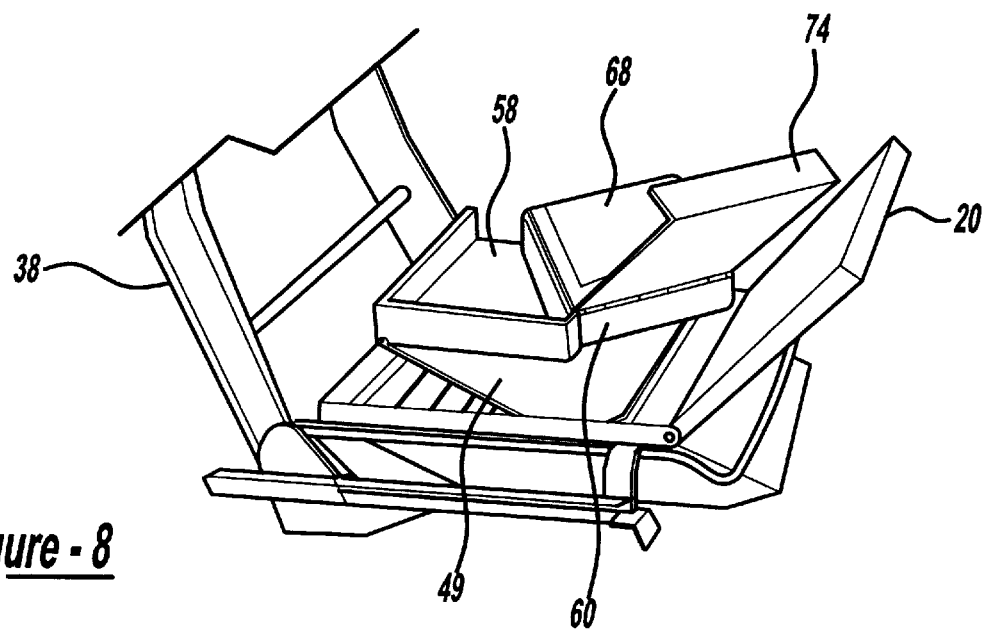
FIG. 8 is a perspective view like FIG. 7, showing an alternative embodiment of the seat assembly.

In an alternative embodiment, the cradle 60 can contain its own lid which is raised to open a compartment in which the computer is contained. In this embodiment, the lid of the cradle forms the horizontal writing surface when the computer is not in use. This embodiment is shown in FIG. 8.

It is to be understood that the invention is not limited to the exact construction illustrated and described above, but that various changes and modifications may be made without departing from the spirit and scope of the invention as defined in the following claims.

We claim:

1. A vehicle seat assembly comprising:
    a generally horizontal seat bottom and a seat back extending generally upwardly at a rear end of the seat bottom, the seat bottom having a seat pad forming an upper portion of the seat bottom and a first part of the seat pad being movable to an open position to access space in the seat bottom beneath the first part of the seat pad; and
    a platform beneath the first part of the pad movable from a stowed position beneath the seat pad to a raised generally horizontal use position to form a generally horizontal table, wherein said platform is part of a module mounted substantially below said seat bottom frame and operable to extend substantially upwardly toward said raised generally horizontal use position, said module also includes at least one shelf.

2. The seat assembly of claim 1 wherein the platform carries a portable personal computer attached thereto to move the portable personal computer between a stowed position beneath the seat pad to a raised generally horizontal use position.

3. The seat assembly of claim 2 wherein the portable personal computer rests upon the platform and the top of the portable personal computer forms a generally horizontal table top surface.

4. The seat assembly of claim 1 wherein said module is mounted substantially below said seat bottom frame between fore and aft extending slide rails used to adjust the position of the seat assembly within a vehicle body.

5. The seat assembly of claim 4 wherein the module includes spaced shelves beneath the first part of the seat pad for paper and file storage between the spaced apart shelves.

6. The seat assembly of claim 1 wherein the first part of the seat pad is a center insert portion located between two non-movable side bolster parts of the seat pad.

7. The seat assembly of claim 6 wherein the center insert of the seat pad moves by rotating upward and forward about a horizontal axis at the front of the seat bottom when moving to the open position.

8. The seat assembly of claim 1 wherein the platform includes a base portion and a cradle which is mounted to the base portion to pivot about a vertical axis to move the cradle toward an adjacent seat assembly within a motor vehicle.

9. The seat assembly of claim 8 wherein the vertical axis is located adjacent a front edge of the platform.

10. The seat assembly of claim 8 wherein the cradle has a top lid that forms a top writing surface of the platform and which is raised to reveal space within the cradle for a portable personal computer.

11. The seat assembly of claim 1 wherein the platform moves upward from the stowed position at an incline to a raised position after which the platform pivots to the generally horizontal position.

12. The seat assembly of claim 9 wherein the platform moves upwardly and rearwardly at an incline.

13. A vehicle seat assembly comprising:
    a generally horizontal seat bottom and a seat back extending generally upwardly at a rear end of the seat bottom, the seat bottom having a seat pad forming an upper portion of the seat bottom and a first part of the seat pad being movable to an open position to access space in the seat bottom beneath the first part of the seat pad; and
    a platform beneath the first part of the pad movable from a stowed position beneath the seat pad to a raised generally horizontal use position to form a generally horizontal table, said platform operable to carry a portable personal computer attached thereto to move the portable personal computer between a stowed position beneath the seat pad to a raised generally horizontal use position.

14. The seat assembly of claim 13 wherein the portable personal computer rests upon the platform and the top of the portable personal computer forms a generally horizontal table top surface.

15. The seat assembly of claim 13 wherein the platform is part of a module attached to the seat bottom between fore and aft extending slide rails used to adjust the position of the seat assembly within a vehicle body.

16. The seat assembly of claim 15 wherein the module includes spaced shelves beneath the first part of the seat pad for paper and file storage between the spaced apart shelves.

17. A vehicle seat assembly comprising:
    a generally horizontal seat bottom and a seat back extending generally upwardly at a rear end of the seat bottom, the seat bottom having a seat pad forming an upper portion of the seat bottom and a first part of the seat pad being movable to an open position to access space in the seat bottom beneath the first part of the seat pad; and
    a platform beneath the first part of the pad movable from a stowed position beneath the seat pad to a raised generally horizontal use position to form a generally horizontal table, said platform including a base portion and a cradle which is mounted to the base portion to pivot about a vertical axis to move the cradle toward an adjacent seat assembly within a motor vehicle.

18. The seat assembly of claim 17 wherein the vertical axis is located adjacent a front edge of the platform.

19. The seat assembly of claim 17 wherein the cradle has a top lid that forms a top writing surface of the platform and which is raised to reveal space within the cradle for a portable personal computer.

20. The seat assembly of claim 17 wherein the platform is part of a module attached to the seat bottom between fore and aft extending slide rails used to adjust the position of the seat assembly within a vehicle body.

* * * * *